(No Model.)
2 Sheets—Sheet 1.
D. F. McDONALD.
SHIP'S BERTH.
No. 430,670. Patented June 24, 1890.
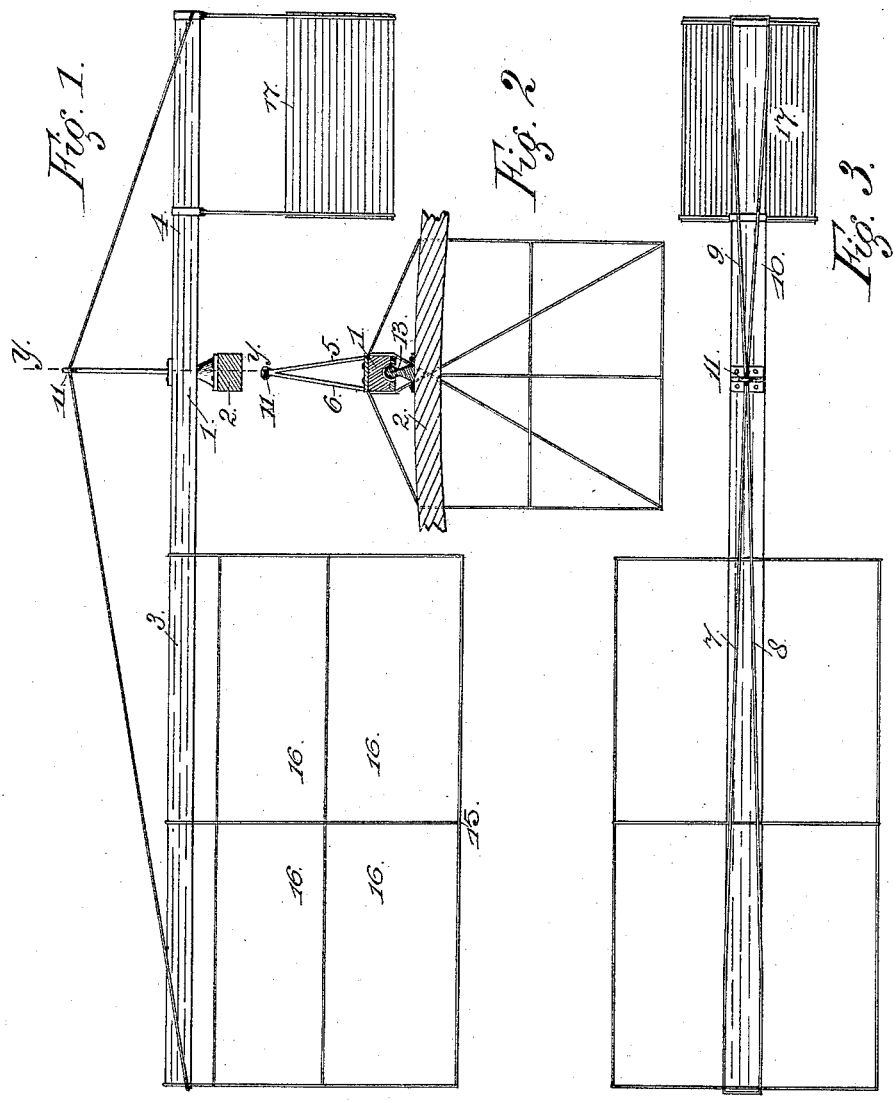
WITNESSES:
INVENTOR
Duncan F. McDonald
BY
ATTORNEY (No Model.) 2 Sheets—Sheet 2.
D. F. McDONALD.
SHIP'S BERTH.
No. 430,670. Patented June 24, 1890.
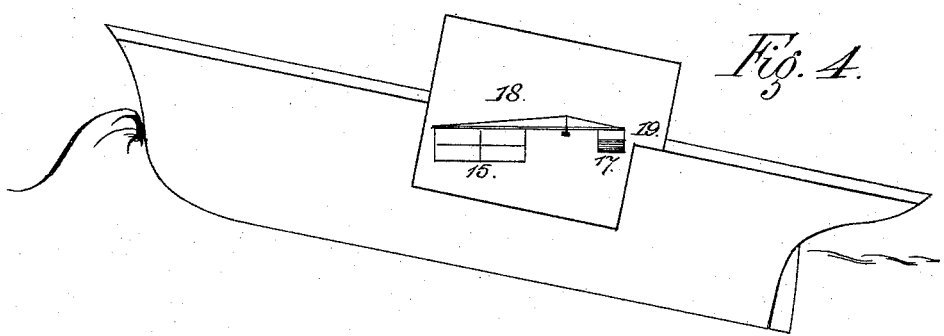
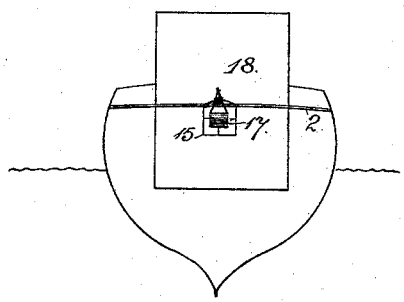
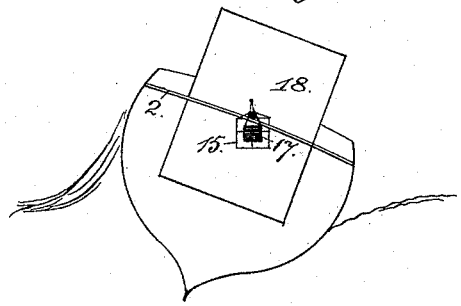

UNITED STATES PATENT OFFICE.

DUNCAN F. McDONALD, OF BERKELEY, CALIFORNIA.

SHIP'S BERTH.

SPECIFICATION forming part of Letters Patent No. 430,670, dated June 24, 1890.

Application filed October 4, 1889. Serial No. 326,054. (No model.)

*To all whom it may concern:*

Be it known that I, DUNCAN F. McDONALD, a citizen of the United States, residing at Berkeley, in the county of Alameda and State of California, have invented certain new and useful Improvements in Ships' Berths; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ships' berths, and the object of my improvement is to provide a means whereby sea-sickness may be effectually overcome, which means shall be of simple construction, easily operated, and at the same time reliable and effective for the purpose intended; to which ends my invention consists of the features, arrangements, and combinations hereinafter described and claimed.

In the drawings is illustrated an embodiment of my invention, in which drawings Figure 1 is a side elevation of several berths provided with my improved attachment. Fig. 2 is a cross-section taken on the line $y\ y$, Fig. 1. Fig. 3 is a top or plan view of the mechanism shown in Fig. 1. Fig. 4 is a side elevation of the outline of the hull of a ship provided with my improvement. Figs. 5 and 6 are end elevations of the device shown in combination with the outline of the ship's hull.

In the views let the reference-numeral 1 indicate a lever of the first class, which, when in its normal condition, extends parallel with the ship's sides or on a line with the ship's general forward movement. This lever is provided with a fulcrum dividing it into two arms 3 and 4, arm 3 being shown in the drawings as twice the length of arm 4.

5 and 6 are two bars secured to the top of the lever directly above the center of the fulcrum. The extremities of these bars, where they are joined, to the lever, are a short distance apart, this distance being about equal to the width of the lever. From their contact extremities with the lever bars 5 and 6 extend upward obliquely and approach each other until they come in contact, where they are joined, and an eye 11 formed thereon, through which passes the braces 7, 8, 9, and 10, secured to and extending between the extremities of the lever, as shown. The lever and fulcrum are connected by a ball-and-socket joint 13, as shown in Fig. 2.

To arm 3, or the longer arm, is rigidly secured in any suitable manner, a sort of cage 15, containing any desired number of berths 16. These berths may be constructed in any suitable manner, regard being had to the comfort and convenience of the passengers.

To the short arm of the lever or arm 4 is secured a weight-basket 17, consisting of any suitable receptacle in which may be thrown weights of any desired size. Into basket 17 is placed a number of the weights used, sufficient in the aggregate to exactly balance the berth-cage 15 when occupied. By using weights sufficiently small a practically perfect balance can at all times be maintained between the berth-cage and the weight-basket.

Lever 1, with its berth-cage and weight basket attachment, is shown in the drawings as supported or balanced by a fulcrum underneath the lever. It may also be suitably suspended from above and the principle of my improvement perfectly carried out. The lever, with its attachments, is supported or suspended and properly balanced within a room 18 sufficiently large to prevent the sides of the room from coming at any time in contact with the lever or its attachments, as might be the case when the vessel careens to one side, as shown in Fig. 6, or when one end is raised higher than the other, as shown in Fig. 4, if the room 18 were too small. A suitable or typical room 18 is illustrated in Figs. 4, 5, and 6. The position of the lever and its attachment relatively to different positions of the vessel is also shown in the same figures.

In describing the operation of my improvement let us consider that the lever and its berth-cage and weight-basket attached thereto constitute the device, considered as a whole and properly referred to in the singular number. Bearing this in mind, whatever may be the position of the hull of the vessel, whether the natural position which it occupies in the smooth sea, (shown in Fig. 5,) the careening position shown in Fig. 6, or the position shown in Fig. 4, when one end of the hull is raised much higher than the other, the lever invariably occupies and automatically maintains its normal or horizontal position the same as in tranquil water. The parts of the vessel or the sides of the room 18 approach the device, while it remains practically stationary by virtue of the entire device being nicely pivoted, either suspended or supported at its center of gravity.

It is not believed that the device will maintain a perfectly stable position, since allowance must be made for friction between the lever and its fulcrum. Therefore in constructing the device the berth-cage is made of the lightest possible material consistent with the necessary strength for the purpose intended, thereby reducing the necessary gravity of the weight-basket and its contents, and indeed the gravity of the whole device to a minimum.

In view of the friction between the lever and its fulcrum, it is believed that it will be found necessary to station a man on a platform 19 adjacent to the outer extremity of the short arm of the device, and so close thereto that he can steady and adjust the whole device, as may be found necessary, by the use of an arm, rope, or other suitable device, one extremity of which he holds in his hands, the other extremity being hinged or otherwise suitably secured to the end of the lever nearer to his position, as stated.

It is believed that the contrivance set forth herein and illustrated in the drawings will effectually prevent the seasickness caused by the rocking and tossing movement of the vessel during a storm or upon a rough sea by preventing the movements of the vessel from being communicated to the berths.

It should be here noted that the apartments 16 in the berth-cage should be so arranged and constructed that the occupants can either sit up or lie down, thereby rendering cage 15 a sort of combined cabin and sleeping-room, so that the occupants may remain therein continually during the day-time as well as at night, if they so desire.

Having thus described my invention, what I claim is—

1. A device for overcoming seasickness, consisting of a lever, a suitable stationary fulcrum by which the lever is either supported or suspended, a berth-cage 15 secured to the long arm of the lever, a weight-basket 17 secured to the short arm of the lever, the relative weight of the berth-cage and weight-basket being regulated so that the whole device will exactly balance, substantially as described.

2. In a device for overcoming seasickness, the combination, with a room 18 of suitable size constructed in the hull of a vessel, of a lever suspended or supported in same room upon a suitable stationary fulcrum, a berth-cage 15 secured to the longer arm of the lever, and a weight-basket 17 secured to the short arm thereof, the relative gravity of the berth-cage and weight-basket being such that the lever shall exactly balance, substantially as described.

3. In a device for overcoming seasickness, the combination, with a room 18 of suitable size constructed in the hull of a vessel, of a lever, a fulcrum upon which the lever is nicely pivoted, a berth-room rigidly secured to and suspended from one arm of the lever, a weight-basket secured to the other arm of the lever, the relative gravity of the berth-room and the weight-basket being such that the whole device shall exactly balance, the lever and its attachments being arranged and connected within room 18, substantially as described.

In testimony whereof I affix my signature in presence of two witnesses.

DUNCAN F. McDONALD.

Witnesses:
R. J. VAN VALKENBURG,
S. BARNHILL.